United States Patent Office
3,686,235
Patented Aug. 22, 1972

3,686,235
CLASS OF LIQUID CRYSTALS
Harold J. Nicholas, 12456 Merrick Drive, Creve Coeur, Mo. 63141, and Furn F. Knapp, Jr., 6700 Torlina Drive, Berkeley, Mo. 63134
No Drawing. Filed Oct. 14, 1969, Ser. No. 866,389
Int. Cl. C07c 169/60
U.S. Cl. 260—397.2   12 Claims

ABSTRACT OF THE DISCLOSURE

The chemical synthesis and isolation from natural sources of a new class of cholesteric and smectic liquid crystals are described. These consist of various fatty acid esters of tetracyclic tritertenes including members of the class of 9,19-cyclopropane triterpenes. These triterpenes include 9,19 - cyclolanost - 24 - en - $3\beta$ - ol (cycloartenol), 4a,14a,24$\xi$ - trimethyl - 9,19 - cyclocholestan - $3\beta$ - ol, 24$\xi$ - methyl - 9,19 - cyclolanostan - $3\beta$ - ol (24$\xi$ - methyl cycloartanol) and 24-dihydro lanosterol and all chemically related products.

Liquid crystals are compounds which generally do not pass directly from the crystalline to the isotropic liquid state when melted. The intermediate phase has optical properties generally associated with crystalline substances even though the material is a liquid. The seemingly contradictory term "liquid crystal" is thus used to describe these interesting substances. Such compounds are anisotropic and transmit light with varying velocity in different directions. They are thus birefringent (doubly refractive). The reason for this crystal-like behavior of mesomorphic liquids is the parallel alignment of the relatively rigid, rod-shaped molecules, due in part to mutual attractive forces. Liquid crystals are subdivided into three categories—nematic, smectic and cholesteric—depending upon the particular type of molecular orientation in the mesophase. Steric effects have been correlated with nematic behavior. Cholesterol and closely related steryl esters are the only steroid forms known to exhibit cholesteric mesomorphism, prior to this invention. For this reason very little is known about the relationship between structure and this phenomenon.

This invention relates to the synthesis of triterpene fatty acid esters which behave as cholesteric liquid crystals. The common feature of these triterpenes is that they are tetracyclic, having either one (4a) or two (4a and 4$\beta$) methyl groups at the 4-position of the nucleus. Also, most of these triterpenes have a 9,19-cyclopropane ring. Others have a C-19 methyl group. In addition, some of these esters are found in nature and may be isolated from a wide variety of natural plant sources.

The compounds were discovered in the course of pursuing a program involving studies on the biosynthesis of sterols and triterpenes in higher plant tissues. One of the plants selected for this study was the banana, which is readily available and possesses an outer tissue (peel) with which the biosynthesis of these compounds is easily studied. The sterol and triterpene content of both peel and pulp have now been thoroughly documented by the present inventors. During this investigation observations were made which resulted in the invention in this application. It was found that certain purified portions of the nonsaponifiable fraction of banana peel gave transient blue to purple colors on fusion at the melting point. In identifying the principal triterpene components of the peel nonsaponifiable fraction, which triterpene is present as the palmitate ester, chemical reduction gave a compound, subsequently identified as 24$\xi$ - methyl - 9,19 - cyclolanostan - $3\beta$ - yl - palmitate, which has cholesteric liquid crystal properties (i.e., produces a purple color on fusion or re-solidification). It became evident that a new class of liquid crystal types could be synthesized chemically and isolated also from natural sources.

Prior to this invention various cholesteryl esters were the only steroidal derivatives described to behave as cholesteric liquid crystals. The principal object of this invention is therefore to provide new cholesteric liquid crystals. Another object of this invention is to provide a series of compounds with which to study the relationship between structure and the ability of a substance to form a cholesteric mesophase. Still another object is to provide cholesteric substances of commercial value in electronics and in other technical applications. A further object of this invention is to describe the isolation in pure form of naturally occurring compounds that exhibit cholesteric liquid crystal properties. Other objects will become apparent from the detailed description of the invention to follow.

The invention described herein may be used in a number of useful applications. As an example, special preparations may be utilized in skin thermography. Preparations may be applied to local areas to detect small temperature differences. Tumor areas or areas of local inflammation have a slightly higher temperature than the surrounding tissue. Colors produced by the liquid crystalline preparation applied to these areas correspond to discrete temperatures. There are many applications of liquid crystal in the electronics field, and such liquid crystalline preparations can be used in electircal ciricuits to detect non-operable electronic tubes due to their lower temperature. In addition, such liquid crystalline preparations may be used as stationary phase materials for gas-liquid chromatography. Such phase materials are exceptionally successful in separating isomers which are not separated by normal methods. Also, the optical properties of these liquid crystals are extremely sensitive to solvent vapor. Small amounts of such vapor in the atmosphere can be detected with such liquid crystalline preparations.

Following are structural formulae of tetracyclic triterpenes whose esters exhibit liquid crystal properties.

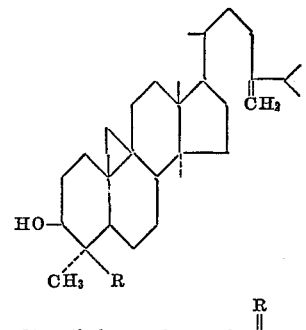

24-methylene cycloartanol—$\overset{\text{R}}{\overset{\|}{\text{C}}}$H$_3$
cycloeucalenol————————H

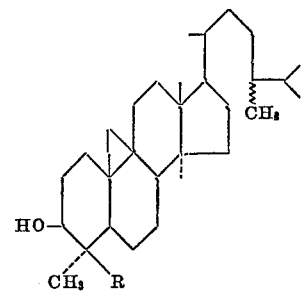

24$\xi$-methyl cycloartanol———$\overset{\text{R}}{\overset{\|}{\text{C}}}$H$_3$
4$\alpha$,14$\alpha$,24$\xi$-trimethyl-9,19-  H
cyclocholestan-3$\beta$-ol————

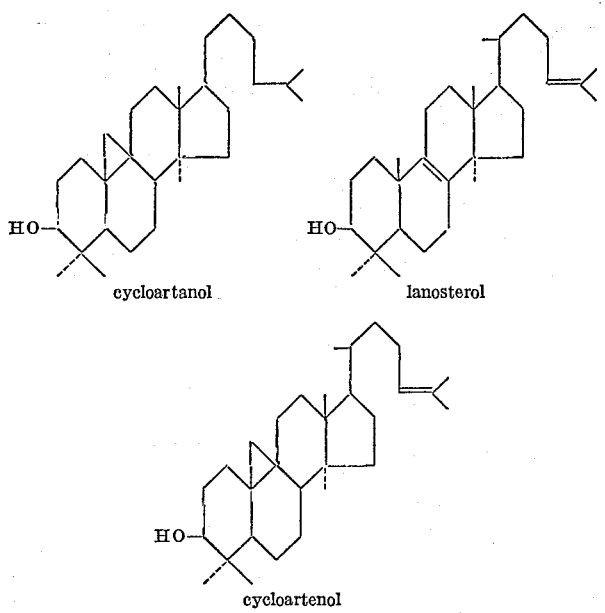

TETRACYCLIC TRITERPENES

The objects of this invention are achieved by two methods. First, cholesteric liquid crystals may be synthesized by esterification of certain triterpenes with fatty acyl chlorides of varying chain lengths. This is accomplished by refluxing the triterpene in anhydrous benzene containing a 1.5 molar excess of the acyl chloride and a trace of pyridine for a short time. That complete esterification of the triterpene has occurred is evidenced by running an aliquot of the reaction mixture on thin-layer chromatography on silica gel G. A solvent system which may be used is trimethyl pentane-ethyl acetate-acetic acid (40/20/0.4). Esters run with the solvent front while free triterpenes have an $R_f$ of about 0.40 to 0.60. If complete esterification has not taken place, an additional portion of the fatty chloride is added and the mixture refluxed in the manner. When complete, the reaction mixture is diluted with an equal volume of ether and the solution then washed with 10 percent HCl. The organic layer is then dried over anhydrous sodium sulfate and the solvent removed by distillation. The residue is added in benzene solution to an alumina column, the esterified material being eluted with benzene. The solvent is removed, and the residue then crystallized to constant melting point. In general, long chain esters ($C_{13}$–$C_{18}$) crystallize best from acetone, while the shorter chain esters ($C_3$–$C_{10}$) crystallize better from methanol-ether. Care should be taken during the purification procedures, since the presence of even small amounts of impurities interferes with the formation of a cholesteric mesophase. Esters of $C_3$–$C_{30}$ can be used with this invention.

Melting points of the purified esters can be determined using a conventional melting point apparatus. If the ester is cholesteric, a color will be observed upon fusion, either upon melting or cooling or both. Generally, however, these colors are best observed upon cooling back to the melting point (i.e., resolidification). A true test that the ester is mesomorphic is the birefringence pattern formed at the transition temperature when these substances are viewed through a polarized microscope.

The isolation of naturally occurring cholesteric liquid crystals is also a major object of this invention, since there are no previous reports of such substances being found in plant material. The dried plant material is extracted exhaustively with ethanol or some other suitable solvent. Upon removal of the solvent, the residue is dissolved in alcohol and an equal volume of water containing 30 percent KOH then added. This mixture is subjected to a mild saponification process by being heated gently on a steam bath. Drastic saponification would hydrolyze the esterified material. This then permits separation of the neutral from the acidic, water soluble material without hydrolyzing the triterpene esters which may be present. The mixture is then extracted with ether, the ether extract washed with water and distilled to dryness. The residue is chromatographed on alumina. Merck acid-washed alumina is suitable for this process. The ester fraction is eluted in the initial benzene fractions. The ester fraction may be further resolved by chromatography on Celite-silica gel-silver nitrate (10:10:8). The solvent for elution is petroleum ether initially containing increasing amounts of benzene, up to about 4 percent. Each fraction is then run by thin-layer chromatography on silica gel G, with the solvent system hexane-ether (93/7). Fractions are combined accordingly, and crystallized as described. Each ester is examined for mesomorphic behavior. To ascertain the identity of the mesomorphic compounds, the esters are saponified in ethanol-water-benzene (80/10/10) by reflux for one hour. The solution is diluted with water and extracted with ether. After evaporation of the ether, the residue is crystallized from a suitable solvent. Acetone usually works well for this purpose. This then represents the purified triterpene which may be identified by gas-liquid chromatographic and chemical properties. The aqueous layer is acidified and extracted with ether. The ether layer is water washed and distilled. The residue is methylated with boron-trifluoridemethanol reagent and identified by gas-liquid chromatography by comparison with known fatty acid methyl esters. Once the identity of the ester is known, it may be synthesized by the methods mentioned previously.

MELTING POINTS AND PHASE TRANSITIONS

Melting points and phase transition temperatures were determined with a Nalge-Axel rod hot-stage polarizing microscope. In some cases the melting points were also determined with a Thomas-Hoover uni-melt apparatus. The phase transition temperature is defined as that temperature at which the birefringence disappeared from the melt, generally coincident with the temperature at which birefringence appeared upon cooling the isotropic liquid. Routinely, phase transition temperatures were determined on cooling. When a viscous, birefringent liquid is observed through the polarizing microscope it may represent either a smectic or cholesteric mesophase. A color is often not seen with these cholesteric mesophases when viewed through the polarizing microscope when the color is easily detected with the naked eye. It is known that cholesteric mesophases can adopt a homeotropic texture which is generally either a dull blue-gray or purple to the naked eye but optically extinct when viewed through crossed polaroids. In addition, cholesteric mesophases may even display no color at all, as is the case with cholesteryl stearate. The mesomorphic compounds described in this paper have only been examined through the polarizing microscope. For this reason we have not differentiated between a colorless cholesteric mesophase and a smectic mesophase. Thus, mesophases that are colored to the naked eye have been termed cholesteric and those which are colorless have been designated as smectic. As indicated in Tables I through III, the colors of the cholesteric mesophases are often varied. The colors were dependent upon both the light source and the background material. Most of the cholesteric mesophases are monotropic with respect to the crystalline solid (e.g. colors are observed only upon cooling from the isotropic liquid). The formation of colors by many of these cholesteric mesophases is extremely sensitive to impurities. As an example 24-dihydro cycloeucalenol palmitate must be highly purified before the colors associated with the Gradjean plane are observed. On the other hand, the color associated with the mesophase of cycloartenyl palmitate is observed when this ester is present in a mixture of non-mesomorphic esters to the extent of only 10 percent. The following abbreviations are used throughout this paper: iso=isotropic liquid, sm=smectic mesophase, ch=cholesteric mesophase; ch→iso means a transition from the cholesteric mesophase to the isotropic liquid. Similarly, sm→iso means a transition from the smectic mesophase to the isotropic liquid.

In the following Tables I–III, the mesomorphic properties of the various tetracyclic triterpene esters are summarized in tabular form. Following are certain highlights from these results:

(1) 24ξ-methyl cycloartanyl palmitate melted at 61–62° to a highly viscous, birefringent liquid. The color was purple with the polaroids crossed at 90°, but changed to green and rose as the eyepiece was rotated. At 63.5° a focal conic texture appeared, with the birefringence disappearing at 64° (colesteric→isotropic). The birefringence reappeared upon cooling to this same temperature (isotropic→cholesteric). On the cooling cycle tiny batonnets appeared. The cholesteric mesophase could be cooled to 49° at which time agitation resulted in rapid crystallization.

(2) The smectic mesophase of the hexanoate of 24-methylene cycloartanol and the corresponding ester of 24ξ-methyl cycloartanol display a beautiful mosaic type of birefringence similar to that of the type B smectic mesophase.

(3) 24-dihydro cycloeucalenyl hexanoate consisted of multi-colored striated crystals when viewed through the polarizing microscope. It melted to an isotropic liquid at 92–93° and cooled to a bright birefringent liquid at 79° (isotropic→cholesteric). When agitated, the mesophase changed to a deep red color. When viewed with the naked eye upon cooling from the isotropic liquid, the mesophase displayed brilliant colors varying from blue to deep red before solidification.

(4) Several of the cholesteric mesophases described here respond rather dramatically to solvent vapors. The palmitic acid ester of 24-dihydro lanosteryl palmitate forms a blue cholesteric mesophase. When a small amount of acetone is mixed with the isotropic melt, it cools to a blue mesophase that is stable at room temperature. The color of such mesophases has remained stable. Cycloartenyl palmitate forms a similar stable mesophase. When heated, this system cools through a series of brilliant colors back to the stable blue color (Isotropic→red→orange→yellow→green→blue).

All of the esters were of high purity as determined by TLC and GLC. Another criterion of purity was the near coincidence of transition temperatures on both heating and cooling. All of the compounds studied were reasonably pure by this criterion; these temperatures in all but a few cases differed by no more than two degrees. Saturated esters generally melted at a higher temperature than the corresponding unsaturated forms. There is a seemingly erratic change in melting point with changing acyl chain length. The smooth curve relationship between transition temperature and chain length is not affected, however, again pointing to high purity.

Triterpene esters.—Synthesis of the homologous series of esters of 24-methylene cycloartanol and its reduced form, 24ξ-methyl cycloartanol (Table I) demonstrates the disruptive effect of the C–24 (31) double bond. While no esters of the unsaturated triterpene are cholesteric, several esters of the C–24 dihydro form display definite colors. These esters include the laurate, myristate and palmitate.

The octanoate seemed to display a slight fugitive blue color and no color was observed with the decanoate. There should be no interruption in the cholesteric properties of a homologous series. Thus, if the laurate and octanoate are both cholesteric, the decanoate should be cholesteric also. The decanoate was not colored, however, and since many milky white substances often appear blue to the naked eye, the octanoate has been designated as forming a smectic mesophase. Several esters of both the saturated and unsaturated triterpenes form a smectic mesophase. These include the butyrate and hexanoate esters of both triterpenes. In addition, neither the acetate, reduced acetate, laurate, myristate, stearate nor reduced stearate are mesomorphic.

To further investigate the disruptive effect of the C–24 (31) double bond and also the effect of a nuclear modification, the series of esters of cycloeucalenol were prepared. This triterpene differs from 24-methylene cycloartanol in that it has only one methyl group at C–4 (4a-methyl). The properties of the esters of this triterpene and its reduced form (4a,14a,24ξ-trimethyl-9,19-cyclocholestan-3B-ol) are summarized in Table II. The palmitic acid ester of cycloeucalenol is not mesomorphic, the isotropic melt passing directly to the crystalline solid upon cooling. The C–24 dihydro ester forms a green cholesteric mesophase, further demonstrating the disruptive effect of the C–24 (31) double bond. The laurate, myristate, stearate and reduced stearate all form a smectic mesophase. In this regard the nonmesomorphic behavior of cycloeucalenyl palmitate must be an odd result. The laurate and myristate of the reduced triterpene also form a slightly blue mesophase, and are thus designated as cholesteric. With the shorter chain esters the situation is more complex. The butyrate, hexanoate, octanoate and decanoate of the unsaturated triterpene are cholesteric, the colors varying from red (butyrate and hexanoate) to blue-green (decanoate). This is similar to the colors detected in the plane texture of the cholesteryl esters, the light scattered from the mesophase of the longer chain esters of cholesterol staying toward the blue end of the spectrum. Similarly, shorter chain esters (acetate, etc.) display colors toward the longer end of the spectrum. Although brilliant colors were observed with the butyrate ester of cycloeucalenol, it has not yet been satisfactorily crystallized. Its melting point and phase transition data are therefore not included in Table II. The hexanoate, octanoate and decanoate of the C–24 dihydro triterpene are also cholesteric. Neither the acetate nor the reduced acetate are mesomorphic. In analogy with those homologous series which have been studied, the transition temperatures steadily decrease with increasing acyl chain length. The transition temperature of the reduced decanoate is the only value out of line. The esters of cycloeucalenol differ markedly with those of 24-methylene cycloartanol where no esters of the unsaturated triterpene are cholesteric. The laurate, myristate, palmitate, stearate and reduced stearate of this triterpene are not even mesomorphic. Thus, the disruptive effect of the C–24 (31) double bond is regulated by both the nuclear structure and the fatty acyl chain length.

The structure of cycloartenol afforded an opportunity to study the effect of a C–24 (25) double bond while not altering the 9,19-cyclolanostan nuclear structure. Preparation of the homologous series of esters of this triterpene (Table III) demonstrate that the C–24 (25) double bond does not disrupt mesophase formation, at least when there is no substituent at C–24. The octanoate, decanoate, laurate, myristate and palmitate esters are cholesteric, the colors all being in the shorter end of the spectrum (Blue to Green). These data again demonstrate the decrease in transition temperature with increasing chain length. Cycloartanyl palmitate forms a faint gray-green mesophase (M.P. 55–55.5°, ch→iso 72°).

These studies indicate very complex structural requirements for cholesteric mesophase formation. One significant result is the disruptive influence of the C–24 (31) double bond, although this effect is augmented by other structural features, including fatty acyl chain length and nuclear structure.

TABLE I

Cholesteric behavior of various esters of 24-methylene cycloartanol and its reduced form, 24-methyl-9,19-cyclolanostan-3β-ol. Melting points and phase transitions were determined using a Nalge-Axelrod hot-stage polarizing microscope. If no mesophase is mentioned, it may be assumed that the solid melted directly to the isotropic liquid; ch=cholesteric, sm=smectic and iso=isotropic; e.g., iso→ch means a transition from the isotropic liquid to a cholesteric mesophase. The arrow indicates if phase transitions were determined on either heating or cooling.

| Ester | Melting point, °C. | Phase transition temperature, °C. | Associated color [1] |
|---|---|---|---|
| Acetate | 111–112 | | |
| Reduced | 110–111.5 | | |
| Butyrate | 72–73 | sm→iso 100.5 | |
| Reduced | 77.5–78 | sm→iso 114.5 | |
| Hexanoate | 106–107 | sm→iso 112 | |
| Reduced | 107–108 | sm→iso 122 | |
| Octanoate | 74–75 | sm→iso 101.5 | |
| Reduced | 63–64 | sm→iso 83.5 | Faint blue. |
| Decanoate | 65–67 | sm→iso 55 | |
| Reduced | 82.5–84 | sm→iso 83.5 | |
| Laurate | 54–57 | | |
| Reduced | 58–60 | ch→iso 65.5 | Green or violet. |
| Myristate | 61–62 | | |
| Reduced | 65–66 | ch→iso 67.5 | Do. |
| Palmitate | 57–59 | | |
| Reduced | 64–65 | iso→ch 64 | Violet. |
| HCl Adduct | 79.5–80.5 | | |
| Stearate | 55–63 | | |
| Reduced | 65–68 | | |

[1] The color sometimes varied, dependent upon the light source. Presumably a Markownikoff addition product at the C-24 olefinic bond.

TABLE II.—ESTERS OF CYCLOEUCALENOL AND 4α, 14α 24ξ TRIMETHYL-9,19-CYCLOCHOLESTAN-3β-ol

| Ester | Melting point, °C. | Phase transition temperature, °C. | Associated color |
|---|---|---|---|
| Acetate | 106–107 | | |
| Reduced | 109–110 | | |
| Butyrate | | | Red. |
| Reduced | | | |
| Hexanoate | 73–74 | ch→iso 59 | Red. |
| Reduced | 89–90 | ch→iso 77 | Red. |
| Octanoate | 77.5–78 | ch→iso 61 | Green. |
| Reduced | 61–63 | ch→iso 77 | Red or blue. |
| Decanoate | 75–77 | ch→iso 56 | Green. |
| Reduced | 76–77 | ch→iso 69 | Blue-green. |
| Laurate | 63–56 | sm→iso 55 | |
| Reduced | 58–59.5 | ch→iso 68 | Dull blue. |
| Myristate | 58–59 | sm/iso 49 | |
| Reduced | 63–67 | ch→iso 61 | Dull blue |
| Palmitate | 60–62 | | |
| Reduced | 62–64 | ch→iso 52 | Green or violet. |
| Stearate | 76–77 | sm→iso 56 | |
| Reduced | 75–76 | sm→iso 69 | |

[1] Reduced refers to the C-24 dihydro form, 4α, 14α, 24ξ-trimethyl, 9,19-cyclocholestan-3β-ol.

TABLE III.—ESTERS OF CYCLOARTENOL

| Ester | Melting point, °C. | Phase transition temperature, °C. | Associated color |
|---|---|---|---|
| Acetate | 119–120 | | |
| Butyrate | 85–87 | | |
| Hexanoate | | | |
| Octanoate | 56–58 | ch→iso 59 | Blue or green. |
| Decanoate | 69–71 | do | Do. |
| Laurate | 52–53.5 | ch→iso 58 | Deep blue or green. |
| Myristate | 49–50 | ch→iso 56 | Deep violet. |
| Palmitate | 62–64 | ch→iso 51 | Green or violet. |
| Stearate | 63–64 | sm→iso 56 | |

The following examples further illustrate this invention. Phase transitions were determined using a Nalge-Axelrod hot-stage polarizing microscope.

EXAMPLE I

The triterpene 24-methylene cycloartanol was reduced with hydrogen gas by shaking at 20 p.s.i. in ethyl acetate solution in the presence of $PtO_2$ for four hours. The product (24ξ-methyl-9,19-cyclolanostan-3β-ol) was purified in the usual manner. Esters were prepared by refluxing 50 mg. of the triterpene with a 1.5 molar excess of the fatty acyl chloride as described. The purified esters were then examined for cholesteric behavior. The results of this study are given in Table I.

EXAMPLE II

Cycloeucalenol (100 mg.) was reduced catalytically as described. The purified product (4α,13α,24ξ-trimethyl-9,19-cyclocholestan-3β-ol) was refluxed for one hour with a 1.5 molar excess of palmitoyl chloride in benzene as described. The purified product was found to turn a deep green color when melting, or cooling to the melting point, with an iso→cho transition temperature of 60–620°.

EXAMPLE III 40 kgm. of *Strychnos nux-vomica* seeds were ground and extracted with ethanol. The non-saponifiable fraction, prepared as described (72 gm.), was chromatographed on 1200 gm. of alumina. The ester fraction was eluted with benzene and re-chromatographed on celite-silica gel-silver nitrate (10:10:8) as described. The major component was crystallized from acetone to a melting point of 62–64°. It turned a deep violet when melted, with a transition temperature of 51°. The ester was saponified as described and the neutral fraction found by GLC to contain cycloartenol (9,19-cyclolanost-24-en-3β-ol). The methylated acidic fraction contained only the methyl ester of palmitic acid. To confirm the identity of the ester 50 mg. of cycloartenol was refluxed with palmitoyl chloride as described. Purification of the product yielded a substance identical in chemical and physical behavior to the naturally occurring cholesteric liquid crystal in *Strychnos-nux-vomica* seeds. This same ester was also isolated from banana peel.

EXAMPLE IV

Cycloartenol palmitate was produced and had a melting point of 52–54° C. It gave a cholesteric mesophase at 51° C. of green or violet color. When reduced, it had a melting point of 52° C. and gave a cholesteric mesophase at 72° C. with a green or violet color.

EXAMPLE V 24-dihydro lanosterol palmitate was esterified in the usual manner and had a melting point of 48–485° with an iso→ch transition temperature of 39° (blue mesophase).

What is claimed is:

1. Fatty acid esters of tetracyclic triterpenes which form a liquid crystalline mesophase, said fatty acid ester having a chain length of $C_3$–$C_{30}$, said tetracyclic triterpene having at least one methyl group at the C-4 position and having a C-9,19-cyclopropane ring.

2. The triterpenes of claim 1 including methyl groups at the 4-alpha and 4-beta positions.

3. The triterpenes of claim 1 having a 4-alpha methyl group and a 4-beta hydrogen atom.

4. The triterpenes of claim 3 including a double bond at the C-24 (31) position.

5. The triterpenes of claim 2 including an alkyl group at the C-24 position.

6. The triterpenes of claim 2 having a C-24 (24) double bond.

7. The triterpenes of claim 1 wherein the C-24 position has a hydrogen or a methyl group.

8. The triterpene of claim 6 being cycloartenol.

9. The triterpene of claim 6 being cycloartanol.

10. The triterpene of claim 7 being 24-methyl cycloartanol.

11. The triterpene of claim 4 being cycloeucalenol.

12. The triterpenes of claim 5 being 24-methyl cycloartanol and 4α,14α,24-trimethyl-9,10-cyclocholestan-3β-ol.

References Cited

UNITED STATES PATENTS

| 3,250,765 | 5/1966 | Jeger et al. | 260—239.55 |
| 3,318,920 | 5/1967 | Meyer et al. | 260—397.2 |

OTHER REFERENCES

Chemical Abstracts vol. 42 Pars. 5585(f) (1960) relied on.

ELBERT L. ROBERTS, Primary Examiner